Patented Dec. 15, 1936

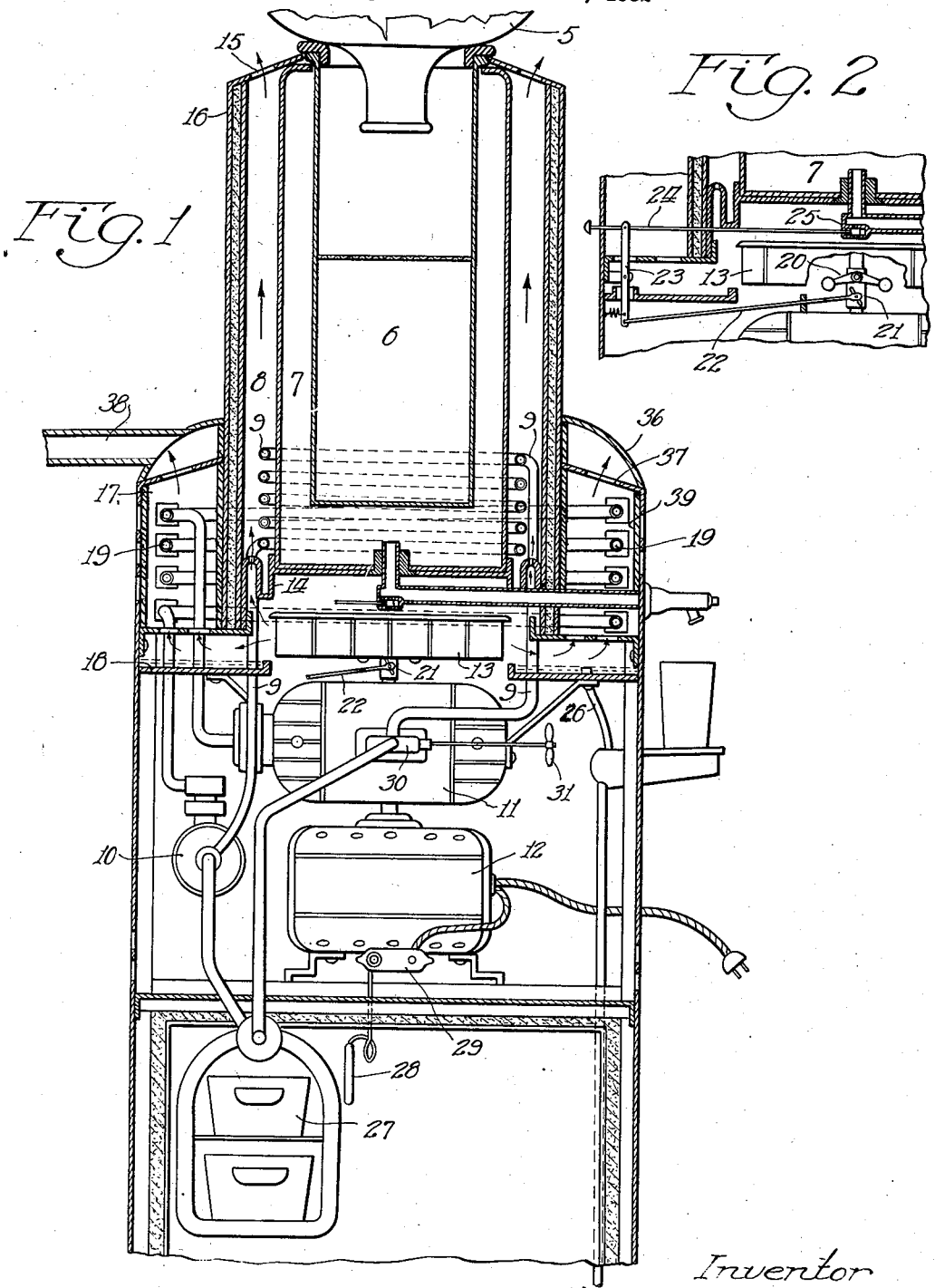

2,064,044

UNITED STATES PATENT OFFICE 2,064,044

COMBINATION COOLER, REFRIGERATOR, AND AIR CONDITIONER

John C. Wichmann, Chicago, Ill.

Application June 25, 1932, Serial No. 619,284
Renewed December 20, 1934

12 Claims. (Cl. 62—128)

My invention relates to a combination electric water cooler, refrigerator and air conditioner, and has to do more particularly with apparatus of the above character adapted for home and office use, although not limited thereto.

One of the features of my invention is a provision of the above type of apparatus in which I provide a constant supply of water which is fed from the water cooling chamber to be sprayed into the path of the air current to assist in cooling and humidifying the same before being passed on into the room.

Another feature of my invention is the automatic control of such water supply whereby it is fed only during the operation of the cooling and refrigerating apparatus.

There are other features of my invention and these will be more particularly pointed out in the ensuing part of the specification and appended claims.

Referring now to the accompanying drawing:

Fig. 1 is a vertical cross-section of the apparatus, and

Fig. 2 is a cross-section of a portion of the apparatus showing the water supply control mechanism.

In general, I provide combination apparatus of the above character preferably in which a drinking water supply is provided by the usual up-ended water bottle adapted to feed down into a water cooling chamber surrounded by cooling coils and carrying air, which air at the same time is conditioned for room supply. Also in this apparatus I provide a refrigerator in the lower portion, all of the equipment being cooled and moistened through action of the refrigerating and air supply apparatus.

Referring now more in detail to the equipment as illustrated, the water bottle 5 is adapted to feed drinking water into a suitable cooling receptacle which may be the usual coil or a drum 6 adapted to receive a filter. When using a drum as 6 the water supply then feeds into an annular water chamber 7 surrounded by a cooling and air chamber 8 in which cooling coils 9 are placed. These latter coils 9 are fed by a suitable refrigerant from a storage or supply tank 10 in connection with a suitable compressor 11 preferably of the rotary type and driven by a motor 12. At the upper end of the shaft of the motor 12 is a horizontally disposed fan 13 adapted to force air outwardly and upwardly through the air chamber 8, the air passing through small openings in the annular pan 14 as indicated by the arrows. This air also passes the cooling coils 9 and out through the openings 15 at the upper end of the casing 16 to provide cooled, and as will be later described, humidified air for the room.

The air from the fan 13 follows a divided path as shown by the arrows in Fig. 1 with a portion passing through the holes in the floor of the outer chamber 17, and the remainder passing through holes in the annular pan 14 and into chamber 8. Prior to passing into the outer chamber 17 and the air chamber 8 from the fan, the air is washed and humidified as well as cooled by water sprayed from the top of the fan 13 upon rotation of the fan. The water collects in the pan 18 to also cool the air as it passes in intimate contact therewith. The water is orignally fed from the water chamber 7 through an outlet in the bottom thereof, which outlet connects with the water faucet, and from the outlet through a valve 25 as shown in Fig. 2. The valve 25 is automatically operated by the action of the fan 13, and feeds the water to the top of the fan 13 only while the latter is being rotated by the motor 12. The operation of the valve and resultant control of the water is brought about by a suitable governor 20 carried by the motor shaft and acting upon a sleeve 21 having an annular slot in the wall thereof, so that as this sleeve 21 moves up and down by the action of the governor, the slot which carries the end of link 22, moves the link horizontally accordingly, and thus through the action of intermediate lever 23 and valve rod 24 opens and closes the valve mechanism 25. Thus while the motor is running, the arms of the governor 20 move outwardly by centrifugal force and maintain valve 21 open so as to slowly drip water from the water supply 6 down onto the disc or top cover of the fan 13. As this fan rotates at high speed, it throws the water outwardly by centrifugal force and forms a spray which is thrown into the path of air that moves upwardly into the cooling chamber 8. Any surplus of this water drains downwardly into the pan 18 where it maintains a supply over the surface of which the air passes into the outer chamber 17, as previously referred to. Any surplus water in this pan 18 drains through the pipe 26 into a suitable receptable at the bottom of the apparatus.

A condenser coil 19 is mounted in the outer chamber 17 and connected between the compressor 11 and the supply tank 10. Air passing through holes in the bottom of the chamber 17, after such air has been cooled, as heretofore explained, passes over the condenser coils to liquefy the compressed refrigerant gas therein as it comes from the compressor 11, so that the refrigerant flows back into the supply tank 10 in liquid form. In effecting condensation of the gas in the coils 19, the air in the chamber 17 is heated slightly. In order to remove the heated air from the room so as not to affect the operation of the refrigerating apparatus, I provide an insulated hood 36 secured above the chamber 17 as shown in Fig. 1. Openings 37 are provided around the top of the chamber to open into the hood 36. An outlet pipe 38 opens out of the hood and may be extended through a window or otherwise directed out of the room to carry the heated air from the chamber 17. Insulation 39 may be used to line the walls of the chamber 17 so as to preclude any possibility of heating the remainder of the apparatus.

In the bottom of the apparatus I preferably provide a refrigerator space having an ice chamber 27. I also preferably provide a suitable thermostat control 28 for the motor, which thermostat controls a switch 29 for opening and closing the motor circuit. Although I have shown this thermostat located in the refrigerating chamber, it may be placed at any other point desired.

From the above description it will be apparent that I have provided a combination electric water cooler, refrigerator and air conditioner, all operated from a single source of power and adapted not only to cool the air that is fed out into the room, but to also humidify it by water contact when passing into the cooling chamber in addition to providing a refrigerating chamber for foodstuffs and the like.

I also provide a suitable means for using either the refrigerator, or the cooling and humidifying apparatus, independently or simultaneously, and to this end a three-way valve 30 is inserted in the refrigerant supply control by the manual handle 31, which may be located either inside the casing or outside. Thus this valve may be operated to shut out the refrigerator cooling supply and use the upper apparatus only, or to shut out the upper apparatus and use the lower apparatus only, or to use both simultaneously. The structure involved in the use of the cooling or upper apparatus may be briefly described as the supply tank 10, the cooling coils 9, the compressor 11, and the condenser coils 19. In the operation of the refrigerating chamber 27 the refrigerant is supplied from the tank 10 to coils in the unit 27, and passes from there to the compressor 11, and then into the condenser coil 19 to be liquefied before returning into the tank 10. As noted above, both upper and lower apparatus may be operated simultaneously, in which case refrigerant is directed from the tank 10 to the coils in the chamber 27, and to the coil 9, from which two places it is carried to the compressor 11, and from there to the condenser 19 to be liquefied before returning to the tank 10. Suitable means may be provided for adjusting the pressures in both lines when both units are operated simultaneously.

Although I have shown a preferred embodiment of my invention, it is apparent that many changes and modifications will occur to those skilled in the art, and therefore I do not desire to limit my invention to the exact arrangement shown and described, but aim to cover all that which comes within the spirit and scope of the appended claims.

What I claim as new and desire to protect by Letters Patent of the United States is:

1. A combination water cooler and air conditioner including a drinking water storage device, an annular cooling chamber surrounding the water storage device, a second annular chamber surrounding the first chamber, a horizontally disposed rotatable fan beneath the water storage device, and means for dividing a current of air from the fan to force it through each of said chambers.

2. A combination water cooler and air conditioner including a drinking water storage device, an annular cooling chamber surrounding the water storage device, a second annular chamber surrounding the first chamber, a horizontally disposed rotatable fan beneath the water storage device, means for dividing a current of air from the fan to force it through each of said chambers, and means for feeding water from the storage supply for contact with the air in each said path thereof.

3. A combination water cooler and air conditioner including a drinking water storage device, an annular cooling chamber surrounding said storage device, a second chamber surrounding the first chamber, a water pan beneath the second chamber, a rotary fan positioned to force a current of air by a divided path through said chambers, means for supplying a water spray to one of said paths, said pan being positioned to collect any surplus water from the spray not taken up by the air passing in the said one path whereby the air in the other path passes over the water in the pan.

4. A combination water cooler and air conditioner including a drinking water storage device, an air conditioning chamber surrounding the water storage device, cooling coils in said chamber for cooling the water supply and air passing therethrough, means for forcing air through said conditioner chamber, a refrigerator, a refrigerant supply for the refrigerator and for the water and air cooling chamber, and means for independently providing a refrigerant supply to the refrigerator, or to the water and air cooling chamber, or to both simultaneously.

5. A combination water cooler and air conditioner including a drinking water storage device, an air conditioning chamber surrounding the water storage device, cooling coils in said chamber for cooling the water supply and the air passing therethrough, means for forcing air through said conditioner chamber, a refrigerator, means for refrigerating said cooling coils and refrigerator, said means including a refrigerant and supply tank, multiple leads extending from said tank to said refrigerator and said cooling coils, and valve mechanism for effecting feeding of the refrigerant to the cooling coil and refrigerator independently or jointly.

6. A combination water cooler and air conditioner apparatus including a drinking water storage device, an annular cooling chamber surrounding the water storage device, a cooling coil disposed in said chamber, a second annular chamber surrounding the first chamber, a fan disposed below said chambers, a condenser coil disposed in said second chamber, means for delivering a refrigerant through the coils, and means for dividing a current of air from the fan to force it through the chambers whereby the air forced through said cooling chamber is cooled, and the air forced through said second chamber cools the condenser coil to condense the refrigerant therein and means for removing the air passing over the condenser coils, after condensing the refrigerant therein.

7. A combination water cooler and air conditioner apparatus including a drinking water storage device, an annular cooling chamber surrounding the water storage device, a cooling coil disposed in said chamber, a second annular chamber surrounding the first chamber, a condenser coil disposed in said second chamber, means for delivering a refrigerant through the coils, a fan mounted below the chambers, means for dividing a current of air forced from the fan to direct it into each of the chambers, means for feeding a water spray from the fan into the path of the air to condition the same before it enters the chambers with said cooling coil in the first chamber further cooling said air forced therethrough, and with said air forced through the second chamber acting to condense the refrigerant in the condenser coils mounted therein.

8. In an apparatus of the class described, a single cabinet housing having therein a water storage device, an air conditioning chamber surrounding said water storage device, and a refrigerating chamber, means in said cabinet for blowing air through the air conditioning chamber, means for feeding water from the water storage device into said air blast, and a single unit multiple lead refrigerating device positioned in the cabinet in a manner and operating for providing cooled water in said storage device, and cooperating with said water supply and air blast to provide conditioned air in the conditioning chamber, and simultaneously therewith operating to provide refrigeration in said refrigerating chamber 9. In an apparatus of the character described, a single cabinet housing, a water storage device in the upper portion of said cabinet, a refrigerating chamber in the lower portion of the cabinet, a single unit multiple lead refrigerating device, said latter device including a cooling coil around said water storage device and a refrigerating coil in said chamber, means positioned beneath the water storage device for blowing air over said cooling coil to cool said air, and means for feeding water from said storage device into the air blast, whereby upon cooperation of said cooling coil, air blast and water supply to provide conditioned air and cooled water and simultaneously in the operation of the single unit to provide a refrigerated chamber.

10. In an apparatus of the character described, a single cabinet housing, a water storage device in the upper portion of said cabinet, an annular cooling chamber surrounding the water storage device, a refrigerating chamber in the lower portion of the housing, a single unit multiple lead refrigerating device, said latter device including a cooling coil in said annular cooling chamber and a refrigerating coil in said refrigerating chamber, and means supported between said refrigerating chamber and cooling chamber for drawing air into the cabinet and blowing said air to the cooling chamber over the cooling coil and out said cabinet whereby to simultaneously provide conditioned air, cooled water, and a refrigerated chamber.

11. In an apparatus of the character described, a single cabinet housing, a water storage device in the upper portion of said cabinet, an annular cooling chamber surrounding the water storage device, a refrigerating chamber in the lower portion of the housing, a single unit multiple lead refrigerating device, said latter device including a cooling coil in said annular cooling chamber and a refrigerating coil in said refrigerating chamber, means supported between said refrigerating chamber and cooling chamber for drawing air into the cabinet and blowing said air to the cooling chamber over the cooling coil and out said cabinet, and means for feeding water from said storage device to the air blast whereby to simultaneously provide conditioned air, cooled water, and a refrigerated chamber.

12. In an apparatus of the character described, a single cabinet for housing a drinking water storage device, an annular chamber surrounding said water storage device, a refrigerating chamber, a single unit multiple lead refrigerating device including a cooling coil in said annular chamber to cool the water in the water storage device and a refrigerating coil for said refrigerating chamber, means for blowing air over the coil in the annular chamber to cool said air, and means for varying the humidity of the air in the annular chamber whereby to simultaneously provide cooled water, conditioned air, and a refrigerated chamber upon operation of said single unit.

JOHN C. WICHMANN.